US008744916B2

(12) United States Patent
Nalik (10) Patent No.: US 8,744,916 B2
(45) Date of Patent: Jun. 3, 2014

(54) METHODS AND SYSTEMS FOR COLLABORATIVE BIDDING IN AUTOMATED ACTIONS

(75) Inventor: Joerg Nalik, San Jose, CA (US)

(73) Assignee: SAP AG, Walldorf (DE)

( * ) Notice: Subject to any disclaimer, the term of this patent is extended or adjusted under 35 U.S.C. 154(b) by 1459 days.

(21) Appl. No.: 11/341,505

(22) Filed: Jan. 30, 2006

(65) Prior Publication Data

US 2007/0192201 A1     Aug. 16, 2007

(51) Int. Cl.
*G06Q 30/08*     (2012.01)

(52) U.S. Cl.
CPC .................................... *G06Q 30/08* (2013.01)
USPC ......................................................... 705/26

(58) Field of Classification Search
CPC ...................................................... G06Q 30/08
See application file for complete search history.

(56) References Cited

U.S. PATENT DOCUMENTS

| | | | |
|---|---|---|---|
| 5,794,219 A * | 8/1998 | Brown ............................. | 705/37 |
| 6,415,270 B1 * | 7/2002 | Rackson et al. ............ | 705/36 R |
| 6,697,824 B1 * | 2/2004 | Bowman-Amuah .......... | 709/229 |
| 6,847,939 B1 * | 1/2005 | Shemesh ......................... | 705/26 |
| 7,200,564 B2 * | 4/2007 | Eichstaedt et al. ................ | 705/8 |
| 7,236,939 B2 * | 6/2007 | Chen et al. ........................ | 705/9 |
| 7,373,312 B1 * | 5/2008 | Poon ............................ | 705/26.3 |
| 7,389,251 B1 * | 6/2008 | Woolston et al. ............... | 705/26 |
| 2001/0032170 A1 * | 10/2001 | Sheth .............................. | 705/37 |
| 2001/0044768 A1 * | 11/2001 | Wares ............................. | 705/37 |
| 2001/0051910 A1 * | 12/2001 | Snelgrove et al. ............. | 705/37 |
| 2001/0056396 A1 * | 12/2001 | Goino ............................ | 705/37 |
| 2002/0007338 A1 * | 1/2002 | Do .................................. | 705/37 |
| 2002/0049664 A1 * | 4/2002 | Hoffman et al. ............... | 705/37 |
| 2002/0065769 A1 * | 5/2002 | Irribarren et al. .............. | 705/37 |
| 2002/0165817 A1 * | 11/2002 | Rackson et al. ............... | 705/37 |
| 2002/0174060 A1 * | 11/2002 | Friedland et al. .............. | 705/37 |
| 2003/0014326 A1 * | 1/2003 | Ben-Meir et al. .............. | 705/26 |
| 2003/0135444 A1 * | 7/2003 | Annamalai et al. ............ | 705/37 |
| 2004/0015428 A2 * | 1/2004 | Johnson et al. ................ | 705/37 |
| 2004/0019572 A1 * | 1/2004 | Metz et al. ..................... | 705/80 |
| 2004/0193506 A1 * | 9/2004 | Zmolek ........................... | 705/27 |
| 2005/0055306 A1 * | 3/2005 | Miller et al. ................... | 705/37 |
| 2005/0149367 A1 * | 7/2005 | Lee et al. ........................ | 705/7 |
| 2006/0041503 A1 * | 2/2006 | Blair et al. ..................... | 705/37 |
| 2006/0190391 A1 * | 8/2006 | Cullen et al. .................. | 705/37 |
| 2006/0200401 A1 * | 9/2006 | Lisani et al. ................... | 705/37 |
| 2006/0224497 A1 * | 10/2006 | Walker et al. .................. | 705/37 |
| 2007/0083437 A1 * | 4/2007 | Hamor ............................ | 705/26 |

* cited by examiner

*Primary Examiner* — Bruce I Ebersman (74) *Attorney, Agent, or Firm* — Finnegan Henderson Farabow Garrett & Dunner, LLP (57) ABSTRACT

Systems and methods are provided for controlling automated auctions and other collaborative tasks. In one exemplary implementation, a system is provided that includes an administrative server running software operative to coordinate an automated auction among a plurality of collaborative bidding entities. One or more collaborative bidding servers are also provided, each running software operative to coordinate collaborative bidding in the automated auction on behalf of a respective collaborative bidding entity. By providing collaborative bidding servers that are separate from the administrative server running the auction, individual users wishing to collaborate on a particular bid may do so using the software running on a respective collaborative server, which is specifically provided to facilitate and coordinate collaborative bidding. Generalized collaborative communication systems and methods are also set forth herein.

26 Claims, 6 Drawing Sheets

METHODS AND SYSTEMS FOR COLLABORATIVE BIDDING IN AUTOMATED ACTIONS

TECHNICAL FIELD

The present invention generally relates to collaborative communication methods and systems. More particularly, and without limitation, the invention relates to collaborative bidding methods and systems for use in, for example, automated or on-line auctions.

BACKGROUND

Automated auctions, including on-line auctions such as those provided through the Internet, are becoming an increasingly popular tool by which individuals, companies or organizations can obtain the lowest possible prices for goods and services that they purchase or obtain the highest possible price for goods and services that they provide. In general, auctions may come in one of two broad types. A standard auction is one in which bidders wishing to purchase goods or services selectively increase their bids in an effort to earn the right to purchase particular goods or services by submitting the highest bid. In a reverse auction, bidders wishing to provide goods or services selectively decrease their bids in an effort to earn the right to provide particular goods or services by submitting the lowest bid.

Conventionally, an automated auction is administered by an individual auction server. The auction server may be connected to a computer network such as the Internet and run auctioning software on behalf of the individual, company or organization administering the auction. Individual bidders may access the auction server via the computer network using a so-called "thin client," which is typically a Web browser displayed via a desktop or laptop computer at the home or office. The individual bidder identifies goods or services that he or she wishes to bid on, manually enters a bid via the Web browser, sees bids from competing bidders, and then selectively changes the bid until the auction is completed, at which point the bidder learns whether he or she has been successful.

Figure 1:
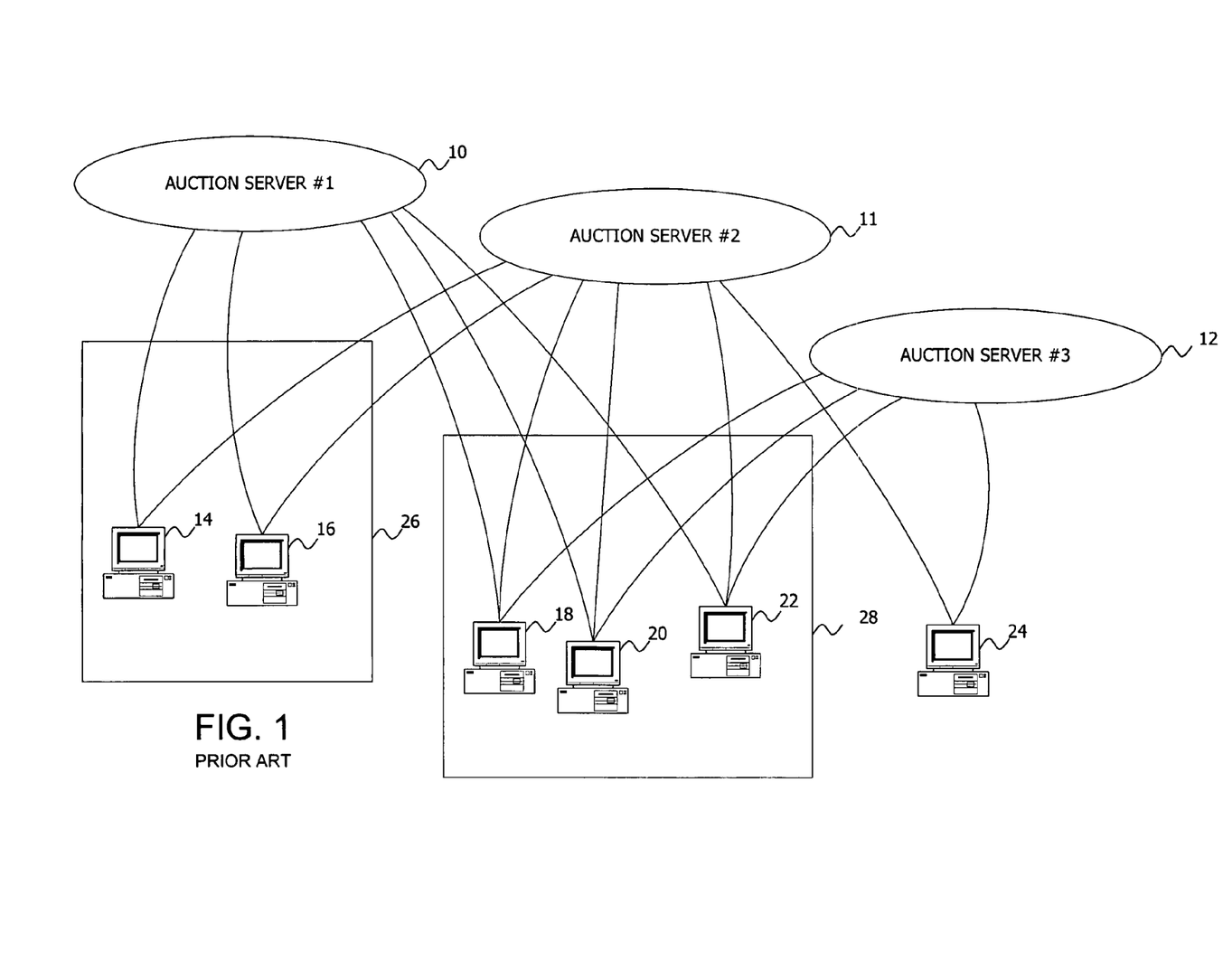
FIG. 1 illustrates a conventional system for automated auctions, including collaborative bidding groups or entities.

An example of a conventional automated auction is illustrated in FIG. 1. Briefly, a number of individual bidders access one or more of a plurality of auction servers 10, 11 and 12 belonging to different auctioneers via Web browsers running on desktop computers 14-24. While a specific number of components is shown in FIG. 1, the total number of auction servers/auctioneers and bidders is arbitrary. Further, the actual interconnection between individual computers and the auction servers may be provided via the Internet or via another suitable networked communication system, not separately shown. In some cases, individual bidders access only a single auction server. In other cases, individual bidders access multiple auction servers concurrently. Even when accessing only a single auction server, an individual bidder may simultaneously bid on multiple items. When bidding on multiple items in a single auction, typically, only a single Web browser interface with that auction server is required. However, when bidding on items offered in different auctions administered by different auction servers, multiple Web browsers are required. This conventional scenario is generally sufficient so long as individual bidders are acting on their own.

With conventional systems, such as that illustrated in FIG. 1, significant problems may arise when the bidder is a company or organization which established and authorized a group of employees, contractors or other individuals to make bid decisions and submit bids. Typically, the members of such a bidding group need to collaborate with one another in determining bid prices. For example, in order to determine the optimal bid price for offering a large number of consumer products in a reverse auction, the bidder may need to know the current prices of raw materials used to make the consumer products, the current costs of any items provided by sub-suppliers, the current production capacities of various manufacturing plants around the world, and the like. This information may need to be obtained from a variety of co-workers throughout the company. Determining an optimal bid price might also require a procedural and approval work-flow within the company, all resulting in a considerable collaboration effort. Given relatively small profit margins, particularly within consumer products, it is critical to identify optimal bidding prices and to do so in a timely manner.

Figure 2:
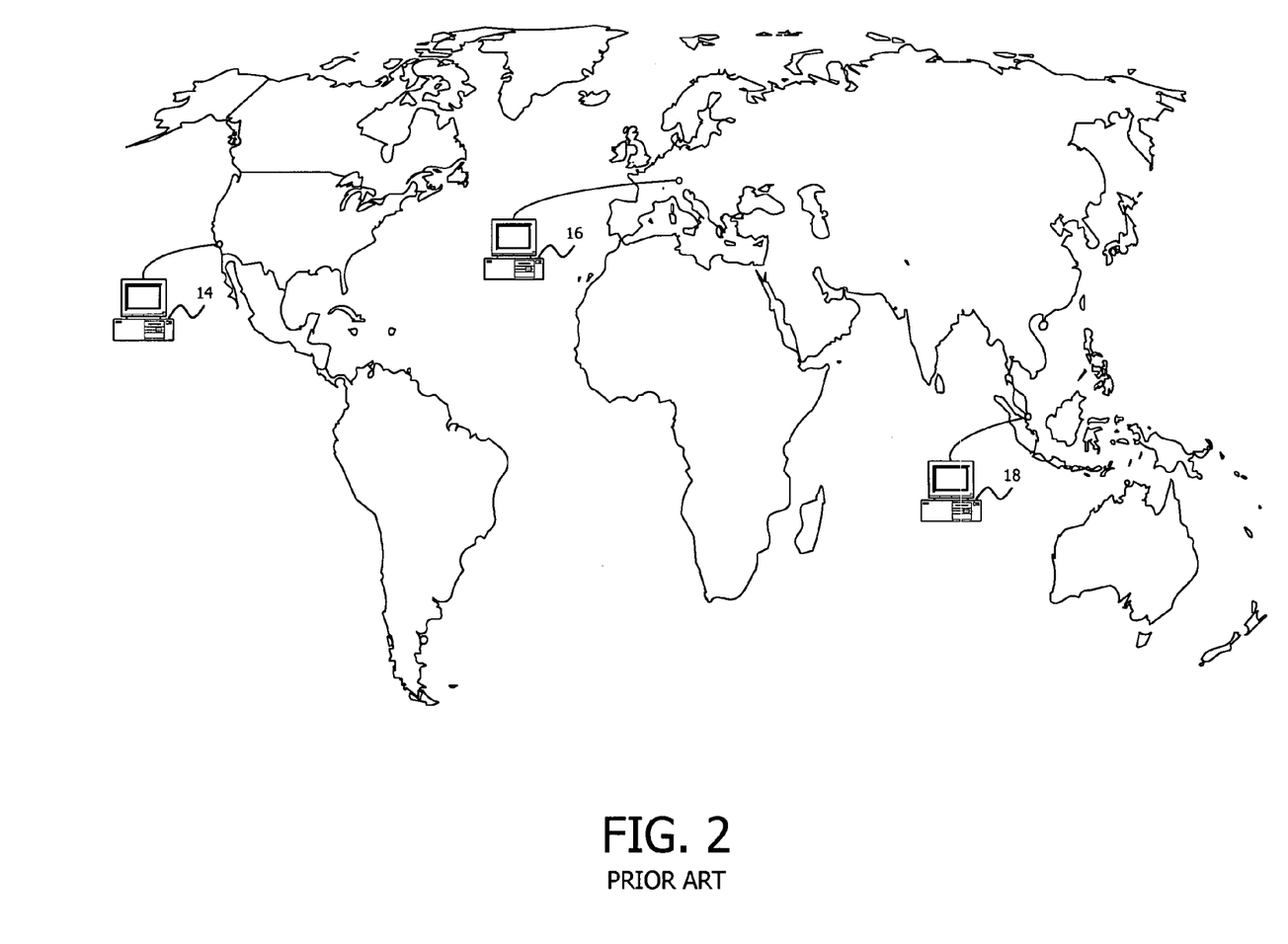
FIG. 2 illustrates an example of a collaborative bidding group of FIG. 1, wherein individual users of the group are located at geographically remote locations.

In the example of FIG. 1, users 14-16 represent one collaborative group 26 or "collaborative bidding entity," whereas users 18-22 represent another collaborative group 28 or collaborative bidding entity. The different collaborative groups may, for example, represent competing companies. Collaboration, even between co-workers of a single company or organization, can be particularly difficult if the collaborators work in different parts of the world, speak different languages, use different currencies, or the like. See, for example, FIG. 2, which illustrates an example wherein the users of a collaborative group are working at widely separated locations around the world. Given the differences in time zones, languages, etc., it can be quite difficult for individuals who need to collaborate on an individual bid to properly collaborate in a timely manner. In some cases, by the time the individuals have reached some decision as to an initial bid and have obtained the authorization from their superiors to submit that bid, the auction may well be over. In order to submit a bid in a timely manner, an individual may have to proceed without all the appropriate information, thus resulting in a non-optimal bid price. In other cases, an individual employee may have the authorization to submit bids within a particular auction, but that bid needs to be coordinated with other bids submitted to other auctions concurrently so as to prevent unnecessary duplication of purchases. In some cases, the business may have a maximum budget allocated for purchasing goods or services the auctions, such that bid submitted to different options must be in coordinated to prevent exceeding the total budget. As can be appreciated, these problems become more and more significant if more and more parties become involved in any given collaborative bidding effort.

Another problem with the conventional bidding solutions is that managing and submitting individual bids, even without the need for collaboration, can be quite labor-intensive. In the context of a company or organization that purchases a large number of goods or services through auctions (or which provides a large number of goods or services via reverse auctions), quite a few individuals may need to be employed to track down goods or services to be purchased at auction, to determine appropriate bidding prices, and then to submit and monitor those bids. Moreover, during the final "hot phase" of an auction, individuals are sometimes not able to make decisions fast enough in order to win the auction. Also, there is a considerable opportunity for bidding errors. Furthermore, when bidding on auctions via a "thin client" there is little or no independent recordkeeping of the auction on the bidder side. It is up to the individual to record bid prices, transactions, etc. Without effective recordkeeping, compliance with tax codes and other legal obligations and compliances can be problematic. Moreover, it can be difficult to adjust bidding strategies for upcoming auctions based upon the success or failure of bidding strategies used in prior auctions without adequate records of those prior auctions.

Hence, there is a significant need to provide improved bidding methods, systems and techniques, particularly for use in collaborative bidding arrangements, and it is to that end that aspects of the invention are directed.

Yet another problem with the conventional auctioning methods and systems is that significant computing power hardware demands are placed upon the auctioning servers, particularly if a large number of different items are being auctioned. Also, one item might be bid on by a large number of bidders. However, the high demand of hardware for auctioning servers results not only from the large bidder numbers but more so from the need to provide each bidder with information of all other bidders actions. These demands are also present in more general "collaborative communications" scenarios. In this context, collaborative communications refer to scenarios where a plurality of clients "collaboratively" work on a common case by transmitting data from each individual client to all other clients, sharing data there-between and exchanging data among each other. Each communications activity accomplished by a client can have impact on parallel and subsequent communications activities of other clients.

In collaborative communications, resources of a central auctioning server can be considered being determined by three terms adding up to total consumption. First, resources of a central server depend on the number of transactions, for instance electronic auctions, performed during a certain period of time. This first term represents the effort of a transaction excluding client communication processing. For the auction example, this would be the processing for setting up an action and operating it.

For this term, it is assumed that the communications activity of one client can be executed asynchronously and independently from communications activities of all other clients and that no access to shared data is required. The resource percentage of the central server required for execution of one communications activity can be considered as a constant. This term linearly increases with the number of transactions performed during a certain period of time like a month or a year and can be defined by:

$$CSR_1 = R*N, \qquad \text{Eq. 1}$$

wherein
  $CSR_1$ indicates the overall Central Server Resources (CSR),
  R indicates a resource factor of the central server for carrying out one transaction excluding client communication processing, and
  N indicates the number of transactions during the certain time period.

Resources of the central server further depend from a second term concerning the fact that many clients participate in a collaborative communications scenario. This term is proportional to the number of clients and their communications activities for participating in a transaction excluding the efforts of exchanging data among all clients. For instance, in the auction example this would be the processing a bidder does for retrieving basic information about the subject of the auction like a request for quotation or an item description. This term normalized to the certain time period like above can be defined by:

$$CSR_2 = n*CCR*N, \qquad \text{Eq. 2}$$

wherein
  $CSR_2$ indicates overall resources of a central server,
  n indicates the number of participating clients,
  CCR indicates a factor for Collaborative Communication Resources (CCR) for one client communication activity during a certain time period, and
  N indicates the number of transactions during the certain time period.

Finally, a third resource term considers that all clients participating in a collaborative communications scenario are provided information concerning each other's communications activities. In the auction example, this would be for instance the effort of distributing one bidder's bid as a new best bid to all other bidders. According to the third term, resources of the central server increase with a square of the number of client. This term can be defined by:

$$CSR_3 = n^2*CIR*N, \qquad \text{Eq. 3}$$

wherein
  $CSR_3$ indicates overall resources of a central server,
  n indicates the number of clients participating in a collaborative communications scenario,
  CIR indicates a factor for Communicating Information Resources (CIR) concerning collaborative communications activities of clients among the participating clients, and
  N indicates the number of collaborative transactions during the certain time period.

In total, resources required for collaborative communications on the side of a central server can be defined by:

$$CSR = CSR_1 + CSR_2 + CSR_3 = R*N + n*CCR*N + n^2*CIR*N, \qquad \text{Eq. 4}$$

wherein CSR indicates overall resources of a central server to support collaborative communication.

As is apparent from Equation 4, methods and systems for collaborative communication relying on a central server supporting a very high number of clients are not be feasible as hardware requirements on the central server side are proportional to the square of the number of served clients. In other words, doubling the number of clients requires a four-fold increase in hardware resources for the central server if n is large and $CSR_3$ becomes the dominant term. Hence, conventional automated auction systems or other collaborative systems that rely on a central server become economically unfeasible as the number of users or clients increases. Furthermore, even with smaller client numbers costs of such a central system are single sided only occurring on the central server provider side while benefits of collaborative business transaction are gained by all transaction participants: the provider and the clients.

Hence, there is a need to provide alternative systems, methods and techniques that more fairly distribute resource burdens and their costs. The alternative systems and methods should also better support and automate activities a client might have to do before communicating via a central server to the overall client community. It is to this end that further aspects of the invention are directed.

SUMMARY

Embodiments consistent with the present invention relate to systems and methods for controlling automated auctions. Embodiments consistent with the invention also relate to systems and methods for collaborative communications for use in, for example, on-line auctions. Further, as disclosed herein, embodiments of the invention may be computer-implemented through any suitable combination of hardware, software and firmware.

In accordance with an embodiment of the invention, a system for controlling automated auctions is provided. The system comprises an administrative server running software operative to coordinate an automated auction among a plurality of collaborative bidding entities and a plurality of collaborative servers each running software operative to coordinate collaborative bidding in the automated auction on behalf of a respective collaborative bidding entity. By providing collaborative servers that are separate from the administrative server running the auction, individual users wishing to collaborate on a particular bid may do so using the software running on the collaborative server, which is specifically provided for coordinating collaborative bidding.

In one exemplary embodiment, the software running on each collaborative server is operative to automatically generate and transmit bids to the administrative server on behalf of the respective bidding entity based on rules provided by the respective bidding entity. Preferably, the software is also operative to optimize the bids on behalf of the respective bidding entity based on one or more of: (1) collaborative information provided by the individual users of the respective collaborative bidding entity, (2) prices of supplies provided by suppliers of the collaborative bidding entity updated substantially in real-time, (3) production capacity of the collaborative bidding entity, (4) information pertaining to the success of bids in previous auctions, and (5) on information pertaining to a plurality of other ongoing bids generated on behalf of the same bidding entity. For example, if a maximum total permissible bidding amount is specified, the software may optimize each individual bid among a group of ongoing bids in accordance with the maximum permissible amount.

In one exemplary embodiment, a plurality of individual users collaborating on the generation of an individual bid may be located in one or more different time zones, employ one or more different currencies, speak in one or more different languages, or are subject to one or more different legal jurisdictions, or have different roles within the collaborative bidding entity. The software running on the collaborative server is operative to coordinate the collaboration of the individual users among the different time zones, currencies, languages, legal jurisdictions, etc. To this end, the software is preferably operative to coordinate the collaboration and decision and activity work flow of the individual clients by providing for exchange of information pertaining to a given bid among the individual users of the collaborative bidding entity.

Consistent with another embodiment, the auction may be, for example, an Internet-based auction in the form of a standard auction wherein bidding entities selectively increase bid amounts in an attempt to gain the right to purchase goods or services being auctioned or, in the form of a reverse auction, wherein bidding entitles selectively decrease bid amounts in an attempt to gain the right to provide goods or services being auctioned.

In accordance with a further embodiment of the invention, systems and methods are provided for collaborative communications for use in auctions, for example. As disclosed herein, a method may be provided for collaborative communications for use in a system including a central server and a plurality of collaborative servers, the central server and the plurality of collaborators servers being connected to a network, wherein each collaborative server can communicate with at least one client and vice versa, respectively. The method may comprise the steps of communicating data from the central server to the plurality of collaborative servers, wherein with respect to each collaborative server the following steps are carried out: processing the data from the central server by the collaborative server to generate client data, communicating the client data from the collaborative server to the at least one client, receiving input data from the at least one client by the collaborative server, the input data being communicated from the at least one client to the collaborative server in response to the client data, processing the input data by the collaborative server to generate collaborator data, and communicating the contributing data from the collaborative server to the central server. Then, the central server may process the collaborator data of the plurality of collaborative servers.

Consistent with one embodiment, a system for collaborative communications may comprise a central server operative to communicate data to a plurality of contributor servers and to receive contributor data from each of the plurality of contributor servers. Each contributor server may be operative to process the data from the central server for generating client data, to communicate the client data to at least one client and to process input data received from the at least one client for generating the contributor data. The at least one client is preferably operative to receive, in response to the client data, input data and to communicate the input data to the respective contributor server.

According to a still further embodiment, a system is provided including one central server plus n client entity servers which is economically feasible for large numbers of client entities when offloading client specific processing load from the central server to the client entity servers. As the number of client entities grows, so is the number of client entity servers growing, such that an increasing processing demand may be compensated with increasing client entity server processing power.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 3:
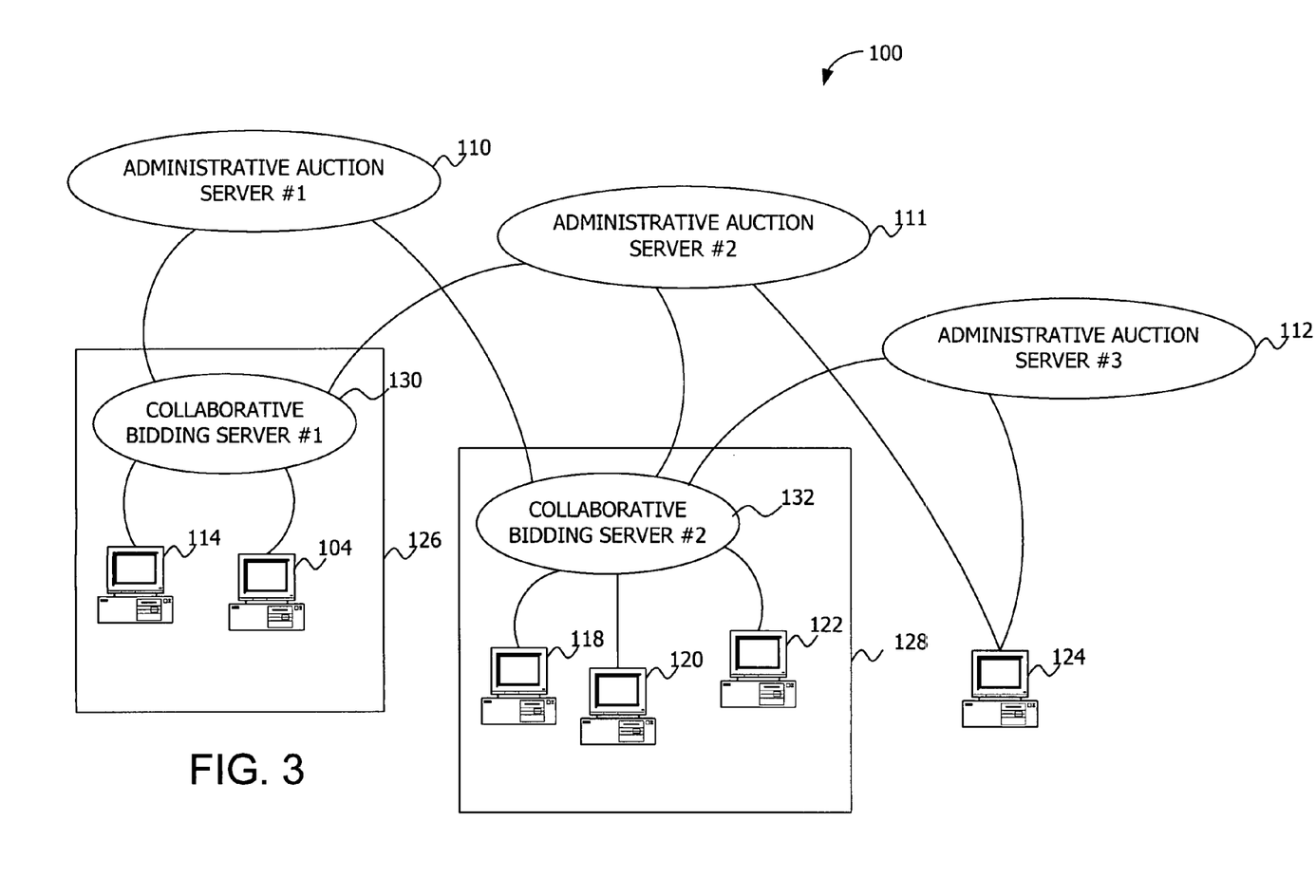
FIG. 3 illustrates an embodiment of the invention, wherein collaborative bidding servers are provided for coordinating the collaboration of users within a given collaborative bidding group or entity.

FIG. 3 provides a high-level overview of an automated auctioning system or architecture 100 configured in accordance with an exemplary embodiment of the invention. In the example of FIG. 3, three administrative auction servers 110, 111 and 112 are illustrated. Depending upon the implementation, the administrative auction servers of FIG. 3 may be identical to the conventional auction servers of FIG. 1 or, as will be explained, may be modified in accordance with features of the invention. A group of individual users 114-124 may participate in auctions supervised by the auction servers. However, the total number of administrative auction servers and the total number of users is arbitrary.

As with the scenario of FIG. 1, some of the users 114-124 in FIG. 3 may form groups of collaborative bidding entities, such as bidding entity 126 and bidding entity 128. Each individual bidding entity may represent, for example, a corporation, organization, partnership or other legal entity. Rather than directly bidding on items within the auctions (as in the scenario of FIG. 1) via thin client interfaces, the users within the collaborative bidding entities of FIG. 3 instead interface with an administrative auction server via a respective collaborative bidding server. Specifically, in example of FIG. 3, a first collaborative bidding server 130 is associated with collaborative bidding entity 126, whereas a second collaborative bidding server 132 is associated with collaborative bidding entity 128. The actual interconnection between the collaborative bidding servers and the administrative auction servers may be provided via the Internet or via another suitable networked communication system, not separately shown. Interconnection between the computers of individual users and their respective collaborative bidding server may be provided via an Intranet, local area network (LAN) or other suitable to medication system, yet not separately shown.

Consistent with the present invention, each collaborative bidding server may run software operative to coordinate collaborative bidding on behalf of its respective collaborative bidding entity. Hence, collaborative bidding server 130 coordinates collaboration between users 112 and 114, whereas collaborative bidding server 132 coordinates collaboration between users 118-122. (Users that are not part of a collaborative entity, such as user 124, can directly access individual administrative auction servers via a thin client interface, as in conventional systems.) By coordinating collaboration, it is meant that, for example, the collaborative bidding server obtains all necessary information from individual users in order to generate a bid and then automatically submits the bid on behalf of the collaborative entity to one of the administrative auction servers. As will be explained, the collaborative bidding servers preferably optimize bids based on one or more factors and in accordance with predetermined rules and then automatically update bids until a given auction is completed.

Figure 4:
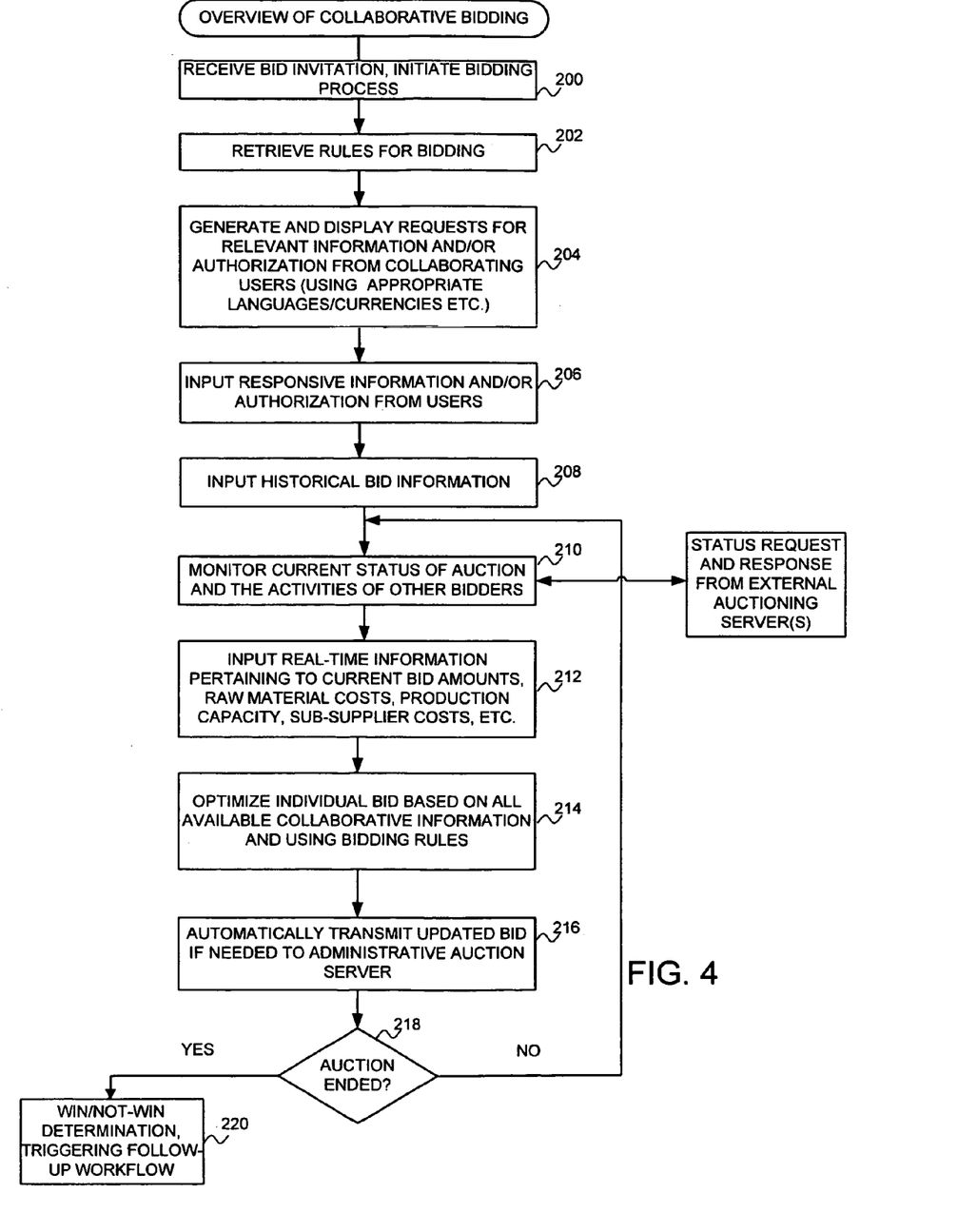
FIG. 4 illustrates an exemplary collaborative bidding method that may be performed by, for example, one of the collaboration auction servers of FIG. 3.

An exemplary method for collaborative bidding using the architecture of FIG. 3 is illustrated in FIG. 4. Beginning at step 200, a bidding process is initiated. The process may be initiated by an individual user of the collaborative bidding entity who receives a Request For Quotation (RFQ) or other form of invitation, for example, to an on-line reverse auction. Alternatively, the process may be initiated by the collaborative server itself, which identifies products that need to be purchased from a requisition database, then identifies matching items for sale among any of a variety of on-line auction servers. In any case, once the bidding process has been initiated, the collaborative server retrieves pre-stored bidding rules, at step 202, from a storage database of the server. These rules specify, for example: (1) the information that needs to be obtained in order to generate a bid, (2) the user or users capable of providing that information (i.e., an indication of the particular roles that the individual users have within the collaborative bidding entity), (3) the types of authorization required before the bid can be submitted, and/or (4) the user or users capable of providing that authorization, as well as any other necessary information, such as any predetermined maximum and minimum acceptable bidding prices, etc.

Based on the rules, the collaborative server, at step 204, then generates and displays requests for relevant information and/or authorization from the appropriate users of the collaborative bidding entity. The requests for information may, for example, contain requests to specify the number of items be purchased, the starting bid price, the maximum bid price, bidding increment, etc. (In other cases, starting bid prices, bidding increment, etc. are determined by the server itself.) The requests for information and/or authorization may be conveyed to the individual users via e-mail or other appropriate messaging techniques and then displayed on the individual desktop computers of the users. Given that the individual users capable of providing the necessary information and/or authorization may work in different countries, speak different languages, employ different currencies, and the like, the collaborative server generates and displays the requests for information and/or authorization using the appropriate language, currencies, etc., based on pre-stored user profile information provided within a database of the server.

At step 206, the collaborative server then inputs responsive information/authorization from the various users. Given that the various users may work in widely different time zones, information may be received by the collaborative server at different times. At step 208, the collaborative server inputs historical bid information from its databases pertaining to previous auctions participated in by the collaborative server for the same or similar items and, in particular, indicating the success or failure of previous bids.

At step 210, the collaborative server retrieves information from the auctioning server about the current status of the auction like the current best bid price and any other information about activities from other bidding entities. This information is added to all the other information gained in the previous steps.

At step 212, the collaborative server inputs any pertinent real-time information relevant to generating a bid, such as the costs of any relevant raw materials, sub-supplier costs, current production capacities, or the like. (These latter factors are particularly relevant in the case that the bid to be generated is for a reverse auction wherein the collaborative bidding entity will be providing goods or services if the bid is successful.)

Once all pertinent information and/or authorizations are received, the collaborative server, at step 214, then optimizes the bid price based on all available collaborative and real-time information, again in accordance with the predetermined bidding rules. By optimization, it is meant that the collaborative server determines the bid price that is most likely to be successful based upon all currently available information and/or historical bid information. In this regard, an expert system software architecture may be employed. Otherwise, conventional adaptive "learning" techniques may additionally be employed. In any case, at step 216, the collaborative server then automatically transmits the bid to one or more administrative auction servers offering the corresponding goods or services if the new bid value determined is better than the existing last best bid by other users. If the bid is not better or if the last best bid is from the collaborative bidding entity itself, no further bid is submitted.

After a certain waiting period (that could be shorter towards the end of an auction) it is checked if the auction has ended. If not, steps 210 through 218 are repeated. The most relevant information which could change through the course of an auction is what competing bidding entities are doing, which is queried in step 210. If, for instance, the current bidding entity was outbid, a new better bid might be calculated and submitted.

It is important to note that this loop back processing of steps 210 through 218 would need to be done by the auctioning server and/or with much reduced feature support for the bidding entity by the auctioning server if the collaborative bidding server would not be used. This effort would need to be done for all bidding entities, and for each bidding entity information from all other bidding entities would need to be processed in the auctioning server. Together this constitutes the $n^2*CIR*N$ term in Eq. 4 (see above). Since steps 210 through 218 are executed many times during an auction it has also be considered that the factor CIR is quite large. Therefore, the $n^2*CIR*N$ term becomes quickly the biggest term of Eq. 4 or in other terms: the steps 210 through 218 would be the largest computing cost factor for an auctioning server if these costs are not distributed to n collaborative bidding entity servers as suggested by the principles of the present invention.

Returning now to step 218, at some point the auction ends and the question of step 218 is answered with yes. Then, the final step 220 is done wherein it is determined if the auction was won or not and if any follow up processes are triggered to start. In the case of a lost auction, this could be just persisting the auction log in a database as "lesson learned" input for future auction. In case of a won auction, the same might happen plus additional procurement or delivery processes might be trigged.

The example of FIG. 4 is only one of many variations which might be implemented in a collaborative bidding server. Simpler as well as more sophisticated workflows are feasible. Also, a collaborative bidding server workflow might adjust to different proprietary auction rules of different auction server technologies.

Although the example of FIG. 4 is directed to the collaborative bidding process for bidding on one particular item in one auction, preferably the collaborative bidding server is capable of simultaneously handling and submitting bids on numerous items in numerous concurrent auctions supervised by numerous administrative auction servers. Indeed, a particular collaborative bidding server may, depending upon its capabilities and the needs of the collaborative bidding entity using that particular server, simultaneously bid on hundreds of items among dozens of auctions controlled by dozens of administrative auction servers. The bid price for any particular item in any particular auction may be optimized based on bid prices of other auctions being simultaneously undertaken. In particular, if the collaborative bidding entity has specified a maximum total purchase permissible amount (as one of the bidding rules), then the bid prices of individual items are preferably optimized based upon that maximum so that the maximum is never exceeded. Also, the collaborative bidding server may take into account local rules and laws in various jurisdictions to the extent that they may be relevant to generating bids. For example, tax rates may have an effect on the optimal bid price. As can be appreciated, the method of FIG. 4 represents just one exemplary technique for coordinating a collaborative bidding process, and numerous other techniques are available in accordance with the principles of the invention.

Figure 5:
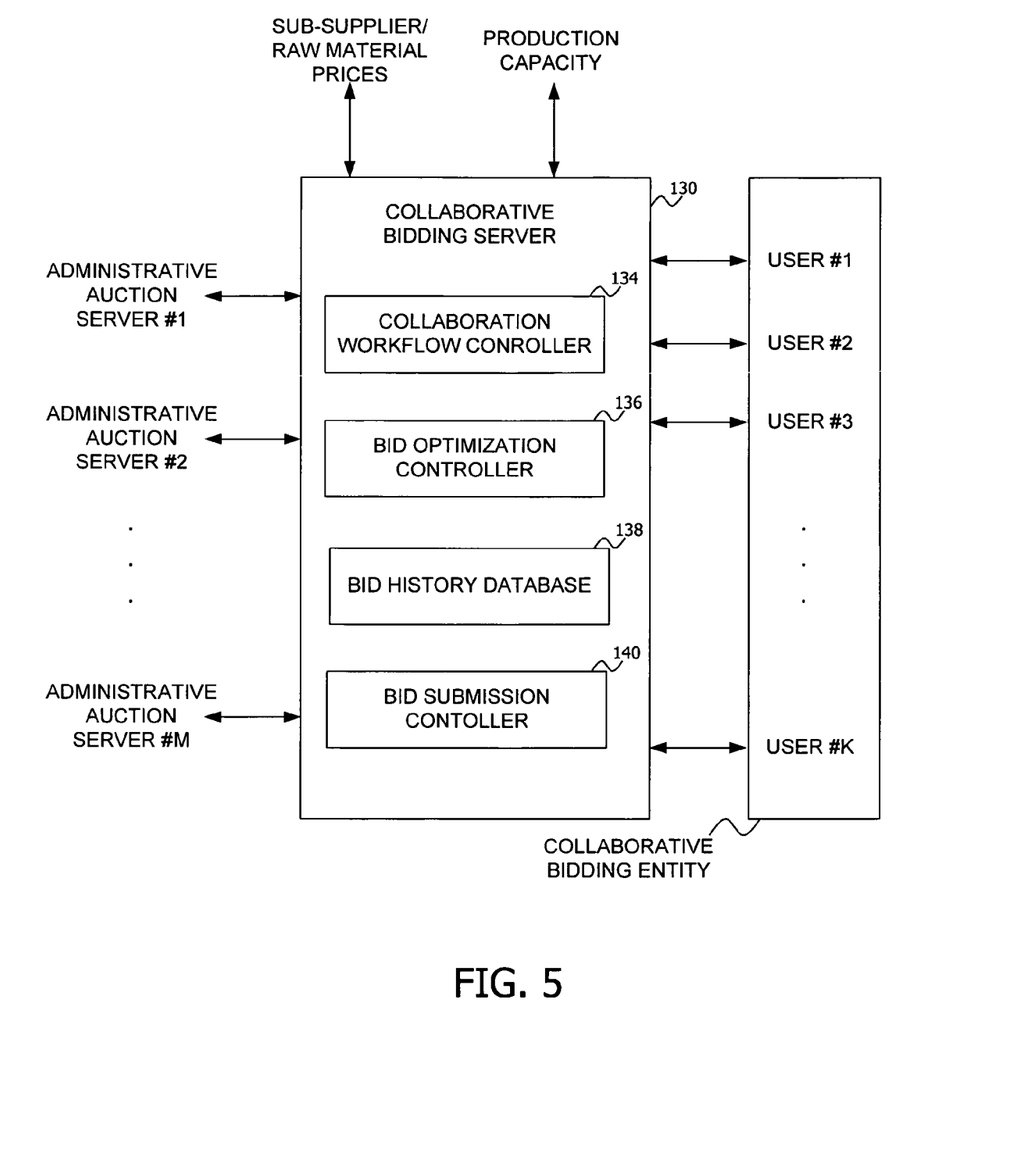
FIG. 5 illustrates an exemplary embodiment of a collaborative bidding server of FIG. 3.

FIG. 5 illustrates components of an exemplary collaborative bidding server 130, consistent with an embodiment of the present invention. The server includes a collaboration workflow controller 134, which coordinates the collaboration among a group of users #1-#K. In one embodiment, the collaboration workflow controller 134 is operative to orchestrate triggering all steps of FIG. 4 in the right order and also to trigger user activities for all the different specialized user experts at the right times. It may also invoke all other components of the collaborative server at the right times according to the overall workflow scheme. One such other component would be a bid optimization controller 136 which optimizes each individual bid based upon information provided by throughout the previous workflow steps, such as real-time information of raw material prices, sub-supplier costs, and production capacity. Further, historical bid information could be retrieved from a bid history database 138, another component, and fed into the bid optimization controller as well.

As further shown in FIG. 5, a bid submission controller 140 may also be provided that actually decides if and when to submit bids to one or more individual administrative auction servers #1-#M and that monitors the auctioning servers to determine the success of the bid and to assert competing bids. In one embodiment, bid submission controller 140 performs the functions corresponding to step 210, 216 and 218 of FIG. 4, or equivalent.

The various components of collaborative bidding server 130 may be implemented with software modules. The software modules of the collaborative bidding server may be programmed for use with standard auctions, reverse auctions, or both. The auctions may be Internet-based auctions or other electronic or automated auctions accessible through any suitable communication network. As noted above, the administrative auction servers may be entirely conventional. However, the administrative auction servers may alternatively be configured to specifically operate in conjunction with the collaborative bidding servers. For example, the administrative auction servers may provide data to the collaborative bidding servers in a format appropriate to the bidding servers or the administrative auction servers may allow the collaborative bidding servers to directly access databases of the administrative servers, so as to facilitate an effective exchange of information there-between. Preferably, however, the majority of steps required to perform any bidding transaction are performed by the collaborative bidding server, rather than by the administrative auction server, so as to reduce resource burdens on the administrative servers while more equitably redistributing those burdens to the collaborative bidding servers.

Although the embodiments described thus far have been presented with respect to auctions wherein collaborative bidding is formed, the collaborative techniques of the invention are applicable to a wide variety of other collaborative communication systems or scenarios. In the following, various general examples of collaborative communication systems consistent with embodiments of the invention are described.

First, however, the manner by which the collaborative techniques consistent with embodiments of the invention serve to more equitably redistribute resource burdens is discussed. Systems including software and computer supported applications for transactional scenarios have traditionally relied on an established client-server-architecture having n clients connected to a single server. Using transactional architectures for collaborative scenarios leads to short-comings on the client side as described before with the bidding client example. One pure transactional example involves enterprise resource planning (ERP) applications. ERP applications provide transactional services to thin clients and users thereof, respectively. Transactional activities for one client can be executed asynchronously and independently from transactional activities of all other clients. Many clients might execute the same or comparable transactions, because no access to shared data is required. As a result, system resources required for executing one client's transaction is a constant, no matter how many other (even equal, comparable) transactions are executed in parallel. ERP applications are highly scalable in the sense that required resources are linearly related to a volume of transactions from all clients together.

An illustrative example for an ERP application is a transactional process including creating a purchase requisition with a number of items and converting the purchase requisition into a purchase order. Many clients can execute transactions with respect to the purchase requisitions and purchase orders in parallel. Transactional data communications of one client goes strictly only to the server and not via the server also to other clients. In general, the above Eq. 1 is applicable to ERP applications.

In contrast, collaborative applications support scenarios were a plurality of clients "collaboratively" participates in communications wherein data sharing and information exchange among at least some of the participating clients will occur. Particularly, single communications activities of a client can influence communications activities of further clients. An example of a collaborative application is the auctioning or bidding application described above with an auction server and many bidding clients, which share information about the (best) last bid. Collaborative applications often include ERP-like sub-processes. Therefore, resources in collaborative applications also depend from Eq. 1. However, collaborative application scenarios result in further resource requirements in line with Eq. 2 and Eq. 3 above. Thus, resource demands for collaborative applications are specified by Eq. 4 above. In order to obtain a feasible application, useable resources should be offset by the benefits or better gains from using the application.

In an ERP application, each performed communications activity produces a gain:

$$G_1 = G(ERP) * N, \quad \text{Eq. 5}$$

wherein
$G_1$ indicates a gain during a time period from all transactions performed during the time period,
G(ERP) indicates a gain from one transaction, and
N indicates a number of transactions during the time period.

A feasible ERP application can be provided when the following requirement is fulfilled:

$$G(ERP) > R, \quad \text{Eq. 6}$$

wherein
G(ERP) indicates the gain from one communications activity, and
R indicates the resource cost factor of providing the central server (see Eq. 1).

Eq. 6 is independent from the number of clients. More clients need more resources and therefore more costs but the gain is growing at the same (linear) pace with the number of clients. The independence of Eq. 6 from the number of clients is the essence and definition of the term "scalability" of ERP applications.

In contrast, corresponding considerations for collaborative applications are not trivial. In a collaborative application, it is possible that gains, with respect to a central server as well as to clients, from each collaborative communications activity might result. With reference to the above auctioning example, only the administrative auction server (e.g., the buyer's or auctioneer's server) has a benefit through increased competition among participating clients. The gain in collaborative applications can be defined as:

$$G_2 = [G(ERP) + n * G(COL)] * N, \quad \text{Eq. 7}$$

wherein
$G_2$ indicates a gain during a time period from all collaborative communications activities performed during the time period,
G(ERP) indicates a gain from one collaborative communications activity,
n indicates a number of clients,
G(COL) indicates a gain for each individual client per collaborative communications activity (which might be null in case of a reverse auction), and
N indicates a number of collaborative communications activities performed during the time period Now consider how resource demands for collaborative communications according to Eq. 4 and a gain according to Eq. 7 can lead to a net benefit (and/or who, server or clients or both, will have the benefit). For known collaborative applications using one server supporting n clients, all resources have to be provided by the server only. As resource demands grow by n and $n^2$ (see Eq. 4), it is possible that resource costs of the server outgrow the of the collaborative scenario gain. This can be defined by:

$$G(ERP) + n * G(COL) > R + n * CCR + n^2 * CIR \quad \text{Eq. 8}$$

From Eq. 4 it is apparent that a growing number n of participating clients leads to also growing resource factors n*CCR and $n^2$*CIR. As a result, a growing number n of clients will lead to a situation where Eq. 8 cannot be fulfilled. The application will not provide any (net) gain and hence will not be economically feasible. In order to stay economically feasible, the number of clients can not be allowed to exceed an upper limit defined by the validity range of Eq. 8. If more clients are required, the traditional ERP-like one central server approach does not work economically any more and an implementation as illustrated in the above embodiment would be more preferable. This can be shown by the following example.

In a classical ERP scenario a client might do one communication/workflow step for one transaction. Accordingly, five clients would do five such steps concurrently but asynchronously and in no special order to each other.

In contrast, five clients might work together in a simple collaborative scenario. If one client does one communication/workflow step this means that the other four clients need to be notified about the result of that step. In total, five communication/workflow steps happen for one activity. The steps happen in a subsequent order. Since each client has about the same role as the others, it can be assumed that each client makes a step of which the others need to be notified. A total of twenty-five steps is the result for a five client collaborative scenario. Compared to the ERP case, the n-square law becomes apparent.

If the collaborative scenario grows more complex an organization might have to increase the number of employees from one to multiple, let's say five. Effectively, this splits one client into five or the five clients of a simple scenario into twenty-five effectively active clients in a more complex scenario. With the same argument as before, in the order of $25^2$ steps=625 steps would need to be handled. This makes quite clear that a central server model alone for a collaborative scenario is at the loosing end when complexity and, thus, the number of clients in such scenario grows.

The above considerations also apply in a simpler case of a collaborative application with no gain for the clients, for example a reverse auction. Such a situation can be defined by:

$$G(ERP) > R + n*CCR + n^2*CIR \qquad \text{Eq. 9}$$

Hence, it is evident that functionalities provided by a single central server to clients are very limited. In general, performance limitations and problems can be overcome by increasing resources. However, this can lead to a situation with no net benefit and no (net) gain.

Such problems are generally overcome by using a so-called "1:n server architecture" proposed herein, i.e., an architecture having a central server and n collaborative servers. Each collaborative server is associated with at least one client. Each client participating in collaborative communications preferably performs as many processing steps as possible on the associated collaborative server and not on the central control server. (An exemplary 1:n-server architecture is shown in FIG. 3, wherein a central administrative server carries out communications with a plurality of collaborative servers to which at least one client or user is associated.) An advantage of a 1:n server architecture is to reduce resource demands for the central server and to distribute resource demands more equally to the entities participating in collaborative communications, i.e., central server, collaborative servers and clients.

In the case each collaborative server is adapted to perform all processing steps, relating to the collaborator's side, a 1:n server architecture will be only subject to the relation for ERP applications according to Eq. 6. For participating entities (collaborative servers and associated clients), a relation for gain and resource demands can be defined as:

$$G(COL) > CCR + n*CIR \qquad \text{Eq. 11}$$

For the administrative server, the relation is:

$$G(ERP) > C(ERP) \qquad \text{Eq. 12}$$

Hence, with the 1:n server architecture consistent with the present invention, the administrative server no longer has the $n^2$ cost growth as in the traditional client-server architecture. The collaborative server has an n-growing cost factor with the 1:n server architecture, but this is manageable. Moreover, resource burdens are distributed more equally in the 1:n server architecture than in the traditional client-server architecture wherein substantially all resource burdens are imposed on the administrator. Moreover, the 1:n server architecture allows a more sophisticated functional support on the collaborators' side, as has already been explained with reference to the auction example of FIGS. 1-5.

Generally speaking, embodiments of the invention provide, inter alia, collaborator applications for collaborative communications within a 1:n server architecture. The collaborator application may be software and/or hardware based. In one embodiment, the collaborator application is located at and/or provided by a server of a collaborator representing an entity of a collaborative communications environment. The collaborator application provides software and/or hardware resources, functionalities, data and the like for performing collaborative communications on the collaborator's side by carrying out as many processing steps as possible and, preferably, all processing steps. The collaborator application is adapted to receive data from a central server in a collaborative communications system and to process the data from the central server in order to generate client data, i.e., data adapted for use by at least one client associated to the collaborator application. For example, association of at least one client and the collaborator application can be provided by a communications link between the at least one client and a collaborative server having and/or providing the collaborator application.

The collaborator application can communicate the client data to the at least one client and receive, in response to the client data, input data from the at least one client. For example, input data can be data provided to the at least one client by a human user of the at least one client and/or generated by the at least one client. Having received the input data, the collaborator application processes the input data to generate collaborator data, which can be considered as data for the central server for collaborative communications from the collaborator's side. Then, the collaborator data are communicated to the central server. In one embodiment, the central server is implemented as a central server application.

In order to support a user of the collaborator application, the collaborator application may include decision rules on which input data can be evaluated. Incorrect or erroneous human input and/or input data generated by an associated client and/or provided to an associated client by a further system can be detected and processing thereof can be avoided and/or stopped. Having detected such input data, the collaborator application can communicate a request to the respective associated client in order to initiate providing proper input data. Such a request can include error messages and/or a further communication of the above client data from the collaborator application to the client and/or newly generated client data.

The collaborator application can use optimization rules for input data provided to the collaborator application. Optimization rules include rules, parameters, boundaries and the like according to which and/or in view of input data to the collaborator application is processed. Input data can be processed, as noted above, in accordance with raw material prices or prices for goods from sub-suppliers of the collaborator, wherein automated updates of respective optimization rules during running collaborative communications are possible. Further, an optimization of bids on a particularly auction item as well as optimization of grand total of bids on all items as well as production capacity changes on the collaborator's side can be considered.

Collaborative communications on the collaborator's side often require input data from two, three, more or even a plurality of parties and/or entities (e.g., multiple clients associated to a collaborative server, users of the collaborative server, databases associated to the collaborative server). In such a collaborative communication scenario, the collaborator application supports such multiple inputs. To illustrate this aspect of the collaborator application, it is referred to a collaborator being a large supplier cooperation. Collaborative communications from the collaborator's side (e.g., prices, offers, bids) possibly including decision and/or optimization rules are often based on activities of a team of people rather than a single person. A team might consist of technical experts, facility and personal availability planers, approval managers, sale representatives, and others. According to this embodiment, the collaborator application supports multiple inputs directly from and/or associated to such a team of people each thereof representing a user of the collaborator application via a respective graphical user interface provided by a client and/or generated by respective clients. Such multiple inputs can be processed by the collaborator application, for example, in view of the above-discussed decision and/or optimization rules in order to enable, for example, an automated communication of data representing collaborative communications from the collaborator's side.

An advantage is that the entity, which is provided input data, is in control of all processes related to the input data. For example, decision rules, optimization rules and/or processing of multiple input data are controlled on the collaborator's side. The collaborator application can generate a database in form of a history. In one embodiment, the history indicates previously received input data and/or previously generated collaborator data, preferably, in relation to associated respective data received from the central server. Such a history enables, for example, optimization of further collaborative communications with respect to input data, processing steps, decision rules, optimization rules and the like. Also, internal strategies and/or internal structures related to the provision of input data and/or the type of input data on the collaborator's side can be optimized.

The collaborator application can provide software and/or hardware interfaces to further systems. Via such interfaces, the collaborator application can receive further input data from, for example, a production planning system, a procurement system, a financial planning system, and a stock keeping system. Further, interfaces can be used to provide information resulting from collaborative communications to other systems associated to the collaborator. For instance, if a reverse auction has been successfully for the collaborator, the collaborator application can provide respective information to a production planning system. In one embodiment, the collaborator application considers global aspects of collaborative communications. Collaborators located in different countries will require respective language support, advantageously also considering the respective time zone. For such functionalities, the collaborator application can support different languages, at least the language of the country in which the respective collaborator is located.

In case the collaborator application does not require human input for collaborative communications, collaborative communications from the collaborator's side can be accomplished without user interaction. This enables the collaborator application to perform its part of collaborative communications irrespective of the current time of the day such that collaborative communications are possible even at a time when no human user will provide input data.

Generally speaking, embodiments of the present invention also provide, inter alia, a central server application for use within a 1:n server architecture. The central server application can be software and/or hardware based. In one embodiment, the central server application is located at and/or provided by a server representing a central server in a collaborative communications environment. The central server application provides software and/or hardware resources, functionalities, data and the like for performing collaborative communications on the central server's side such that a minimal amount of processing steps are carried out on the central server's side. The central server application collaboratively communicates with entities participating in collaborative communications with the central server, e.g., servers associated to a collaborator, an example to which reference will be made below. In order to initiate collaborate communications, the central server application communicates respective data to the collaborative servers. Such data can be generated by the central server application itself or can be provided to the central server application from the central server and/or a further system associated to the central server and/or the central server application. Such data can be also generated by the central server application using data from the central server and/or an associated system.

Having communicated the data to the collaborators servers, it is possible that the central server application respectively maintains communications links used for this data transfer. Such a communications links can be also terminated in general, wherein respective new communications links are established for communications back to the central server. Further, it is possible to selectively maintain and terminate communications links between the central server application and collaborative servers. In order to minimize processing steps on the central server's side, it is preferred that the central server application controls communications links originating from the central server and/or the central server application, while communications links leading to the central server and/or the central server application can be controlled by collaborative servers. Based on the data from the central server application, the collaborative servers may carry out their processing steps for collaborative communications and return collaborator data. Having received collaborator data, the central server application will process the same in order to, for example, terminate collaborative communications by respective processing steps on the central server application's side.

Figure 6:
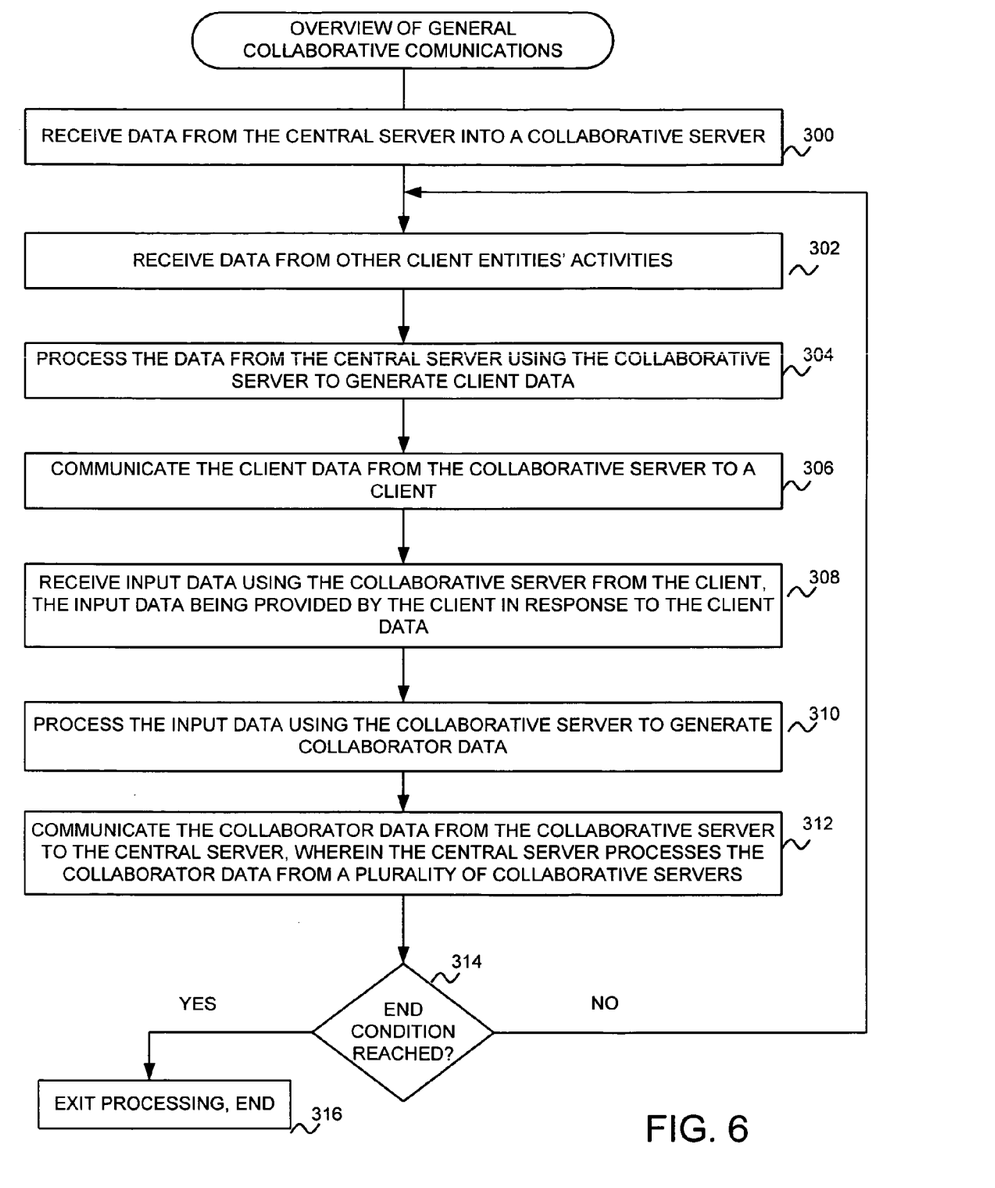
FIG. 6 provides an exemplary overview of collaborative communications performed in accordance with an embodiment of the invention.

The operation of a general collaborative communications system is summarized in the example of FIG. 6. Initially, at step 300, static data is received from the central server by a plurality of collaborative servers. This data would have general character and would not change during a collaborative business scenario execution. In contrast, changing dynamic data is retrieved in step 302. The most important example for such data would be information about the activity of other collaborative entities. At step 304, the static and dynamic data from the central server is processed by the collaborative server to generate client data. At step 306, the client data is communicated from the collaborative server to a client. At step 308, input data is received by the collaborative server from the client in response to the client data that had been sent to the client. At step 310, the input data is processed by the collaborative server to generate collaborator data. At step 312, the collaborator data is communicated from the collaborative server to the central server, wherein the central server processes the collaborator data of a plurality of collaborative servers.

Thereafter, a check is done if the collaborative scenario reached an end condition. In general, multiple passes of steps 302 through 312 may be needed to complete the collaborative scenario. The auctioning scenarios previously described are an example for this. If the end condition is not reached, a loopback to step 302 is done. If the end condition is reached, exit processing is performed and the collaborative scenario ends with step 314. The end processing could include persisting history and result data of the collaborative scenario and triggering follow up ERP-like transactions or other collaborative scenarios.

As explained for the auctioning scenario, the multiple passes of steps 302 through 312 cause the $n^2*CIR$ to become large and dominant because it makes the CIR factor large. Therefore, the classical client-server architecture can not support large client numbers in collaborative scenarios like in FIG. 6. The 1:n server architecture proposed herein is more beneficial in this regard.

Although the invention has been described relative to a specific exemplary embodiments and aspects thereof, there are numerous possible variations and modifications. One skilled in the art will also appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. Accordingly, embodiments of the invention are not limited to the above described embodiments and examples, but instead is defined by the appended claims in light of their full scope of equivalents.

The foregoing description has been presented for purposes of illustration and description. It is not exhaustive and does not limit the invention to the precise forms, features or embodiments disclosed. Modifications and variations are possible in light of the above teachings and/or may be acquired from practicing embodiments of the invention. Other embodiments of the invention will be apparent to those skilled in the art from consideration of the specification and practice of the embodiments of the invention disclosed herein. Therefore, the specification and examples should be considered as exemplary only, with a true scope and spirit of the invention being indicated by the following claims.

What is claimed is:

1. A system for controlling automated auctions, comprising:
    an administrative server; and
    a plurality of collaborative bidding servers, each collaborative bidding server comprising a plurality of entities collaborating to submit a bid,
    the plurality of collaborative bidding servers configured to increase a gain G(COL) of the system defined by:

$$G(COL) > CCR + n*CIR;$$

where:
        CCR is a factor descriptive of collaborative communication resources used by the plurality of collaborative bidding servers;
        n is a number of collaborative bidding servers in the plurality of collaborative bidding servers; and
        CIR is a factor descriptive of communicating information resources;
    wherein the increasing a gain G(COL) comprises:
        identifying a collaborative bidding entity associated with at least one of the plurality of collaborative bidding servers that is operable to provide bidding information,
        obtaining the bidding information from the identified collaborative bidding entity,
        executing decision rules to evaluate the obtained bidding information to determine whether the bidding information is correct bidding information;
        responsive to determining that the bidding information is incorrect:
            communicating a request to the identified collaborative bidding entity to provide the correct bidding information, and
            obtaining the correct bidding information; and
        generating the bid based on optimization rules and on the correct bidding information,
    wherein software running on each of the plurality of collaborative bidding servers is operative to:
    automatically generate and transmit the bid to the administrative server on behalf of a respective bidding entity; and
    optimize the bid on behalf of the respective bidding entity based on prices of supplies provided by suppliers of a respective collaborative bidding entity, wherein the prices of supplies are updated in real-time.

2. The system of claim 1, wherein the software running on each of the plurality of collaborative bidding servers is further operative to automatically generate the bid based on information and rules provided by the respective bidding entity.

3. The system of claim 2, wherein the software running on each of the plurality of collaborative bidding servers is further operative to optimize the bid on behalf of the respective bidding entity based on the information provided by a respective collaborative bidding entity.

4. The system of claim 2, wherein the software running on each of the plurality of collaborative bidding servers is further operative to optimize the bid on behalf of the respective bidding entity based on production capacity of a respective collaborative bidding entity.

5. The system of claim 2, wherein:
    the collaborative bidding entity bids on a plurality of items, and
    the software running on each of the plurality of collaborative bidding servers is further operative to optimize individual bids on behalf of the respective bidding entity based on information pertaining to the plurality of bids.

6. The system of claim 5, wherein:
    the information pertaining to the plurality of bids includes a maximum cumulative bid price for all items, and
    the software running on each of the plurality of collaborative bidding servers is further operative to optimize individual bids on behalf of a respective bidding entity based on the maximum cumulative bid price.

7. The system of claim 2, wherein:
    the respective collaborative bidding entity bids on items in a plurality of different auctions, and
    the software running on a collaborative server is further operative to optimize individual bids in a current auction based on the information pertaining to the success, if any, of bids in previous auctions.

8. The system of claim 1, wherein:
    the plurality of entities are in one or more different time zones, and
    the software running on the collaborative server is further operative to coordinate collaboration of the entities among the different time zones.

9. The system of claim 1, wherein:
    the plurality of entities employ one or more different currencies, and
    the software running on the collaborative server is further operative to coordinate the collaboration of the entities among the different currencies.

10. The system of claim 1, wherein:
    the plurality of entities speak in one or more different languages, and
    the software running on each of the plurality of collaborative bidding servers is further operative to coordinate collaboration of the entities among the different languages.

11. The system of claim 1, wherein:
    the plurality of entities are subject to one or more different legal jurisdictions, and
    the software running on the collaborative server is further operative to coordinate the collaboration of the entities among the different jurisdictions.

12. The system of claim 1, wherein:
    the plurality of entities different roles within the collaborative bidding entity, and
    the software running on the collaborative server is further operative to coordinate the collaboration of the plurality of entities among the individuals with different roles.

13. The system of claim 1, wherein the software running on the collaborative server is further operative to coordinate the collaboration of the entities, in part, by providing for exchange of information pertaining to a given bid among the entities of the collaborative bidding entity.

14. The system of claim 1, wherein the auction is an Internet-based auction.

15. The system of claim 1, wherein the auction is a standard auction that permits bidding entities to selectively increase bid amounts in an attempt to gain the right to purchase goods or services being auctioned.

16. The system of claim 1, wherein the auction is a reverse auction that permits bidding entities to selectively decrease bid amounts in an attempt to gain the right to provide goods or services being auctioned.

17. A method comprising:
calculating an increase of a gain G(COL) by a plurality of collaborative bidding servers of a system comprising the plurality of collaborators bidding servers, the gain G(COL) defined by:

$$G(COL) > CCR + n*CIR;$$

where:
CCR is a factor descriptive of collaborative communication resources used by the plurality of collaborative bidding server;
n is a number of collaborative bidding servers in the plurality of collaborative bidding servers; and
CIR is factor descriptive of communicating information resources;

wherein increasing the gain G(COL) comprises:
identifying a collaborative bidding entity associated with at least one of the plurality of collaborative bidding servers that is operable to provide bidding information,
obtaining the bidding information from the identified collaborative bidding entity,
executing decision rules to evaluate the obtained bidding information to determine whether the bidding information is correct bidding information;
responsive to determining that the bidding information is incorrect:
communicating a request to the identified collaborative bidding entity provide the correct bidding information, and
obtaining the correct bidding information; and
generating the bid based on optimization rules and on the correct bidding information, wherein software running on each of the plurality of collaborative bidding servers is operative to:
automatically generate and transmit the bid to the administrative server on behalf of a respective bidding entity; and
optimize the bid on behalf of the respective bidding entity based on prices of supplies provided by suppliers of a respective collaborative bidding entity, wherein the prices of supplies are updated in real-time.

18. The method claim 17, wherein at least one of the plurality of collaborative bidding servers comprises a collaborator application for collaborative communications and the method further comprises processing, via the at least one of the plurality of collaborative bidding servers, data from a central server by the collaborator application.

19. The method of claim 17, wherein at least one of the plurality of collaborative bidding servers comprises a collaborator application for collaborative communications and the method further comprises processing, via the at least one of the plurality of collaborative bidding servers, input data from a plurality of clients by the collaborator application.

20. The method of claim 17, further comprising maintaining a communications link for communicating the data from the central server from at least one of the plurality of collaborative bidding servers.

21. The method of claim 17, further comprising displaying data associated with the bidding information on a graphical user interface.

22. The method of claim 17, further comprising receiving, at least one of the plurality of collaborative bidding servers, multiple input data from the plurality of clients.

23. The method of claim 17, further comprising receiving, at least one of the plurality of collaborative bidding servers, input generated by at least one of a plurality of clients.

24. The method of claim 17, further comprising generating and maintaining, via at least one of the plurality of collaborative bidding servers, a history of input data related to a former collaborator.

25. The method of claim 17, further comprising, via at least one of the plurality of collaborative bidding server, processing the data from a central server to generate client data according to at least one of a given language and a given time zone.

26. The method of claim 17, further comprising receiving, at a central server, a bid invitation by at least one of the plurality of collaborative bidding servers.

* * * * *